(12) United States Patent
Oka et al.

(10) Patent No.: US 8,156,687 B2
(45) Date of Patent: Apr. 17, 2012

(54) METHOD FOR EVALUATING DEEP ROOTING PROPERTY OF PLANT

(75) Inventors: Ichiro Oka, Iwata (JP); Masakazu Kashihara, Iwata (JP)

(73) Assignee: Japan Tobacco Inc., Tokyo (JP)

( * ) Notice: Subject to any disclaimer, the term of this patent is extended or adjusted under 35 U.S.C. 154(b) by 960 days.

(21) Appl. No.: 11/920,423

(22) PCT Filed: May 16, 2005

(86) PCT No.: PCT/JP2005/008876
§ 371 (c)(1),
(2), (4) Date: May 30, 2008

(87) PCT Pub. No.: WO2006/123392
PCT Pub. Date: Nov. 23, 2006

(65) Prior Publication Data
US 2009/0064575 A1 Mar. 12, 2009

(51) Int. Cl.
*A01C 1/00* (2006.01)
(52) U.S. Cl. .................................................. 47/58.1 R
(58) Field of Classification Search ............. 47/79, 65.5, 47/66.6, 66.7, 58.1 R, 59 R, 60
See application file for complete search history.

(56) References Cited

FOREIGN PATENT DOCUMENTS

| JP | 9-171770 A | 7/1997 |
|---|---|---|
| JP | 3084897 | 12/2001 |
| JP | 3084897 U | 12/2001 |
| JP | 2003-230318 A | 8/2003 |

OTHER PUBLICATIONS

Hironori et al., Japanese Journal of Crop Science, vol. 66 [4], 1997, pp. 559-570.
Nemoto et al., "Deep Rooted Varieties Detected through the Observation of Root Characteristics Using the Trench Method", Breeding Science, vol. 48, 1998, pp. 321-324.
Mla et al., "Root System Structure of Six Food Legume Species: Inter- and Intraspecific Variations", Japanese Journal of Crop Science, vol. 65, 1996, pp. 131-140.
Trillana et al., "Comparison of Root System Development in Two Rice Cultivars During Stress Recovery form Drought and the Plant Traits for Drought Resistance", Plant Production Science, vol. 4, 2001, pp. 155-159.
Wada et al., Japanese Journal of Crop Science, vol. 70 [4], 2001, pp. 580-587.

*Primary Examiner* — T. Nguyen
(74) *Attorney, Agent, or Firm* — Birch, Stewart, Kolasch & Birch, LLP

(57) ABSTRACT

The present invention relates to a method of evaluating multiple plant individuals or plant lines for deep rooting property under the same culture medium moisture conditions. A method of the present invention is a method of evaluating multiple plant individuals for deep rooting property under the same culture medium moisture conditions, by planting multiple plant individuals together in a sufficiently deep culture vessel and lowering the culture medium moisture content gradually. The present invention also provides a method for evaluating plants for deep rooting property, wherein a culture vessel is installed in a water tank so that the culture medium moisture content can be readily adjusted, and thus management of cultivation conditions is facile and efficient. It is possible to select a plant which can grow in dry and low-groundwater level environment efficiently, by using the method of the present invention. Thus, the method of the present invention can find application in breeding a crop suitable for dry land cultivation and trees usable in desert greening.

9 Claims, 4 Drawing Sheets

METHOD FOR EVALUATING DEEP ROOTING PROPERTY OF PLANT

TECHNICAL FIELD

The present invention relates to methods for evaluating a trait which allows plants to elongate their roots more deeply into the soil, i.e., a trait relating to deep root growth (deep rooting property) of plants. The present invention also relates to methods for conveniently selecting plants capable of deeply elongating their roots under drought conditions.

BACKGROUND ART

Growth of plants is greatly influenced by moisture conditions of soil. In order to adapt themselves to conditions where moisture in soil is lacking and to maintain their growth, plants adopt a strategy of drought resistance via drought avoidance or physiological tolerance. Drought avoidance refers to a property, for example, of avoiding drought stress by deeply elongating their roots into the soil or resting during periods when moisture is lacking in the soil. Physiological tolerance to drought refers to a property of plants which allows them to grow even in dry environments.

Currently, farms are located mostly in semiarid zones around the world, and crop production is greatly limited by the amount of water available. In soil, the moisture content is often relatively high at a greater depth as compared to soil closer to the surface because drying of soil starts from the surface and proceeds downwards. Thus, drought avoidance mediated by a trait which allows plants to more deeply elongate their roots into the ground, i.e., deep root growth (deep rooting property), among other adaptation strategies of plants against drought conditions is expected to greatly contribute to growth maintenance and increased yield of plants in drought regions. Drought avoidance by plants is also helpful in conservation of the environment globally. To develop deep-rooted plants, a large number of plants must be evaluated, but it is difficult to evaluate roots of a large number of individual plants by direct observation because roots exist in the soil, therefore there is a need for developing more convenient and efficient methods for evaluating deep root growth (deep rooting property) of plants.

Several methods for examining plants for deep root growth (deep rooting property) have been known, including the trench method, cylinder method, etc.

According to the trench method, plants are cultivated in a field and a trench of about 0.5 m to 2 m in depth is dug to examine the thickness and number of roots of the plants at different depths in the trench (Nemoto, H., Suga, R., et al., Breeding Science 48: 321-324, 1998). The trench method requires much labor for digging a trench and involves difficulty in evaluating a large number plants. Moreover, soil moisture conditions are influenced by natural weather because plants are cultivated in a field. Individuals, lines or varieties evaluated as rapidly elongating their roots under sufficient soil moisture conditions do not always rapidly elongate their roots under drought conditions, because it may be highly possible that the root growth speed varies with soil moisture conditions, i.e., moisture content. Thus, even if such labor-intensive examination is used, there exists a risk of selecting varieties/lines which are poor at elongating their roots under drought conditions.

According to the cylinder method, a plant is cultivated in a cylinder made from plastic or the like and the growth of roots is examined.

An example of the cylinder method comprises cultivating a plant in a transparent plastic cylinder inclined to allow roots to appear on the lateral face and measuring the growth speed or maximum depth of the roots (Mia, M. W., Yamauchi, A., et al., Japanese Journal of Crop Science, 13: 131-140, 1996). This method has the advantage that roots can be directly observed, but only one plant can be examined in a cylinder because it cannot be known for certain which root originates from which plant if multiple plants are planted in one cylinder.

Trillana et al. sowed rice seeds in a pot of 1 m in length made from polyvinyl chloride, followed by submerged cultivation at a water level of 2 or 3 cm above the surface of soil for 14 days after sowing, and partially drained water on 62 days after sowing to lower the water level to 30 cm from the bottom of the pot (60 cm below the surface of soil), and continued cultivation for 6 days, followed by submerged cultivation at a water level of 2 or 3 cm above the surface of soil again, and compared the densities of roots and dry weights of leaves and stems (Trillana, N., Inamura, T., et al., Plant Production Science 4: 155-159, 2001). The method of Trillana et al. is not suitable for large-scale screening because it is thought that much labor is required to adjust the water level by replenishing each vessel with water everyday to keep the water level constant after drought stress treatment. Moreover, the method of Trillana et al. requires 4 hours to drain water for drought stress treatment. The water level is lowered only once in this test, which is very inconvenient when the water level is to be gradually lowered in several steps. If water is added from above to fill a tall vessel packed with soil, it is difficult to remove the air in the soil and a considerable time is required until water penetrates into the soil. Thus, the method of Trillana et al. is suitable for basic studies dealing with few tested plants, but unsuitable for breeding, which requires analyses of a large number of individuals.

In both cylinder methods disclosed by Mia et al. and Trillana et al., different varieties are cultivated in separate vessels, and therefore, the growth of roots of multiple varieties is not compared under the same soil moisture conditions. The soil moisture content in a culture vessel always varies with the amount of water absorbed by the plant. The amount of water absorbed by a plant varies with environmental conditions and growth stage as well as the size of the plant and the like, so that the soil moisture content is greatly influenced by these factors. If different varieties are planted in separate vessels, they cannot be compared under the same soil moisture conditions because varieties of larger plants undergo stronger drought stress earlier than varieties of smaller plants even under the same temperature or light conditions. In fact, the report of Trillana et al. shows that the soil moisture content at the end of drought stress treatment varied between the varieties cultivated, allegedly because of the difference in the growth of aerial parts. As described above, they kept the water level constant after drought stress treatment by replenishing each vessel with water everyday, but this operation requires much labor and if this water level adjustment were omitted, it would be certain that the soil moisture content would vary more widely between vessels, and this difference appears to greatly influence test results. Thus, deep rooting property cannot be compared under the same soil moisture conditions when multiple varieties or lines are cultivated in separate vessels because the soil moisture conditions vary between the vessels.

A method for evaluating drought resistance of plants rather than deep rooting property using plastic pots has been proposed (JPA 2003-230318). This method comprises growing a test plant in multiple pots under suitable cultivation conditions for a short period, then stopping irrigation to perform drought stress treatment, followed by cultivation under sufficient irrigation for a given period by varying the irrigation period pot by pot, and then examining the survival rate in relation to a period of drought stress treatment. In this method for evaluating drought resistance it is also shown that the soil moisture content varies between pots over time after drought stress treatment because only one type (variety) of plant is grown in one pot. Thus, the survival rate widely differs between two varieties having the same drought resistance limit even if they are treated drought stress for the same number of days. This method is very complicated because it involves preparing multiple pots for each tested plant and measuring the soil moisture content for each period to compare the survival rate at the same soil moisture content. Thus, the drought resistance test using pots also causes a difference in soil moisture content when different plants are cultivated in separate vessels, which makes it difficult to compare drought resistance between the plants.

A method for evaluating drought resistance in plants by using relatively shallow pots has also been reported (Wada, Suzuki, et al., Japanese Journal of Crop Science, 70: 580-587, 2001). This method comprising growing multiple test plants in one pot under suitable cultivation conditions for a short period, then stopping irrigation to perform drought stress treatment, and cultivating the plants under sufficient irrigation again for a certain period, wherein the growth state of each plant is examined at various instants. This method does not require much labor and allows multiple plants to be compared at the same soil moisture content, but it "compares drought resistance under low soil moisture conditions" and has little relevance to the trait allowing plants to elongate their roots deeply into soil to avoid drought (i.e., deep rooting property) (Nemoto, H., Suga, R., et al., (1998) Breeding Science 48; 321-324) and plants selected by this method are not always deep-rooted.

In order to develop deep-rooted plants, it is necessary to test a number of individuals or lines, but conventional methods for evaluating plants for deep rooting property as described above are unsuitable for testing a large number of tested plants under the same soil moisture conditions. There is a need for methods for efficiently and conveniently evaluating/screening a large number of plants for deep rooting property under the same soil moisture conditions wherein cultivation conditions can be readily controlled, e.g., the soil moisture content can be readily adjusted.

Patent document 1: JP 2003-230318 A
Non-patent document 1: Nemoto, H., Suga, R., et al., Breeding Science 48: 321-324, 1998
Non-patent document 2: Mia, M. W., Yamauchi, A., et al., Japanese Journal of Crop Science, 13: 131-140, 1996
Non-patent document 3: Trillana, N., Inamura, T., et al., Plant Production Science 4: 155-159, 2001
Non-patent document 4: Wada, Suzuki, et al., Japanese Journal of Crop Science, 70: 580-587, 2001.

DISCLOSURE OF THE INVENTION

Problems to be Solved by the Invention

An object of the present invention is to provide a method for conveniently and efficiently evaluating and selecting deep-rooted plants.

Another object of the present invention is to provide a method for evaluating multiple individuals or lines for deep rooting property under the same culture medium moisture conditions without actually measuring the root length.

Another object of the present invention is to provide a method for efficiently evaluating plants for deep rooting property wherein test conditions such as culture medium moisture content can be readily controlled.

Means to Solve the Problems

In order to solve the problems above, we invented a method for efficiently evaluating plants for deep rooting property under the same culture medium moisture conditions by planting multiple plant individuals in a sufficiently deep culture vessel. We also invented such a method wherein an open-bottomed culture vessel is installed in a water tank pooling water so that the culture medium moisture content in the culture vessel can be readily adjusted by changing the water level in the water tank. As a result, we achieved the methods of the present invention.

The present invention is explained in detail below.

The present invention is characterized in that plants are evaluated for drought avoidance mediated by deep rooting property by planting multiple plant individuals in a vessel having a depth enough for the plants to elongate their roots and then gradually decreasing the moisture content downward from the surface of the culture medium.

Accordingly, the present invention provides a method for evaluating multiple plant individuals for deep rooting property under the same culture medium moisture conditions, comprising the steps of:

(1) planting multiple plant individuals in a culture vessel having a depth enough for the plants to elongate their roots and packed with a culture medium;

(2) gradually decreasing the moisture content of the culture medium to impose drought stress on the plants; and (3) evaluating the plants for deep rooting property from drought stress symptoms observed in the plants.

In another embodiment, the present invention provides a method for evaluating multiple plant individuals for deep rooting property under the same culture medium moisture conditions, comprising the steps of:

(1) installing in a water tank an open-bottomed culture vessel having a depth enough for plants to elongate their roots and packed with a culture medium;

(2) planting multiple plant individuals in the culture vessel;

(3) gradually decreasing the moisture content of the culture medium by lowering the water level in the water tank to impose drought stress on the plants; and (4) evaluating the plants for deep rooting property from drought stress symptoms observed in the plants.

The deep rooting property evaluation methods of the present invention described above can also be used to select deep-rooted plants. Such methods for selecting deep-rooted plants are also included in the scope of the present invention. The methods for selecting deep-rooted plants comprise selecting individuals showing mild drought stress symptoms in the plants during the last step of the deep rooting property evaluation methods of the present invention as deep-rooted plants.

In the methods of the present invention, the culture vessel is open-bottomed to allow water to travel between the water tank and the culture vessel so that the water level in the culture vessel also drops by lowering the water level in the water tank and the culture medium in the culture vessel is gradually dehydrated downward from the surface. All of the plants cultivated in the same culture vessel are under the same culture medium moisture conditions, though the manner in which dehydration of the culture medium proceeds may somewhat differ between culture vessels. Plants capable of elongating their roots downward faster than the rate of dehydration of the culture medium, i.e., deep-rooted plants are not subjected to drought stress because they can absorb water. However, plants slowly elongating their roots show drought stress symptoms because soil around the roots dries.

Drought stress refers to the influence imposed on plants when the moisture content decreases in the environment where they grow. The symptoms observed in plants under drought stress are herein referred to as drought stress symptoms. Drought stress symptoms include, e.g., apparent symptoms such as growth arrest, leaf curl, wilting, death as well as stomatal closure and impaired photosynthesis.

In this manner, the same culture medium moisture conditions can be provided by cultivating multiple plant individuals in the same vessel and deep-rooted plants can be readily selected by comparing their drought stress symptoms.

It should be noted here that multiple plant individuals evaluated for deep rooting property in the methods of the present invention may belong to the same species or different species. Preferably, the multiple plant individuals belong to the same species, but may belong to the same line or different lines. As used herein, the same species means that two or more plant individuals belong to the same taxonomical plant species. As used herein, the same line means that two or more plant individuals are substantially identical to each other at the genetic level. As used herein, different line means that two or more plant individuals belong to strains of different traits because of one or more differences at the genetic level. Thus, relationships between plant individuals of different lines include, but are not limited to, e.g., relationship between plants of different varieties; relationship between a wild-type plant and a plant transformed from the wild-type plant; relationship between a plant of $F_0$ generation and a plant of $F_n$ generation (wherein n is an integer of 1 or more) in a crossing experiment: relationship between plants of $F_1$ generation having inherited different genes in a crossing experiment, etc. The methods for evaluating multiple plant individuals of different lines for deep rooting property and selecting deep-rooted plants according to the present invention provide effective tools in breeding drought resistant plants.

Plants that can be evaluated for deep rooting property by the methods of the present invention are not limited so far as they have relatively long roots and a size suitable for growth in a culture vessel, but preferably include seed plants, more preferably angiosperms, more preferably herbaceous plants, more preferably herbaceous plants having roots growing to a length of 10 cm or more. Specifically, they may be selected from a group consisting of rice, maize, wheat, barley, sorghum, pearl millet, Italian millet, sugar cane, Italian ryegrass, tobacco, rapeseed, cotton, eggplant, tomato, cucumber, stevia, soybean, *Arabidopsis thaliana*, and ornamental plants, more preferably the group consisting of rice, maize, and tobacco. However, it should be understood that the methods of the present invention can be used for even plants having very long roots such as trees when they are young.

The shape of the vessel in which plants are cultivated (hereinafter referred to as "culture vessel") is not specifically limited, but is preferably cylindrical or cubic because of ease of handling. The depth of the culture vessel is not specifically limited so far as it is sufficient for the target plant to elongate its roots and it also depends on the target plant, but typically preferably 30 cm or more and 300 cm or less, more preferably 40 cm or more and 250 cm or less, more preferably 50 cm or more and 200 cm or less. The cross-sectional area of the culture vessel is not specifically limited so far as it is sufficient for cultivating the target plant, but typically preferably 20 $cm^2$ to 25 $m^2$, more preferably 30 $cm^2$ to 10 $m^2$, more preferably 40 $cm^2$ to 5 $m^2$.

Preferred ranges of the depth and the cross-sectional area of the culture vessel will be more specifically as follows though they depend on the size of the target plant. For relatively small plants such as Arabidopsis thaliana, the culture vessel preferably has a depth of 30 cm or more and 100 cm or less and a cross-sectional area of 20 $cm^2$ to 1 $m^2$. For medium-sized plants such as rice, wheat, rapeseed, or soybean, the culture vessel preferably has a depth of 50 cm or more and 200 cm or less and a cross-sectional area of 20 $cm^2$ to 1 $m^2$. For large plants such as maize and tobacco, the culture vessel preferably has a depth of 50 cm or more and 300 cm or less and a cross-sectional area of 400 $cm^2$ to 25 $m^2$.

The culture vessel has an open bottom for feeding and draining water. The opening may be of any kind that allows a culture medium to be retained in the vessel and water to travel between the culture vessel and the water tank. For this purpose, at least one hole through which sufficient water can pass is typically formed in the bottom or the lateral wall near the bottom (hereinafter referred to as "bottom hole"). A hole for feeding or draining water may be formed in the lateral face of the culture vessel as appropriate to also serve as a vent hole for feeding oxygen to roots, though it is not essential. Materials for the culture vessel are preferably plastics such as polyvinyl chloride or polycarbonates; non-corrosive or corrosion-resistant metals such as stainless alloys or aluminum; or ceramics; and materials that corrode or release harmful substances during cultivation are not preferable. When plants having very long roots are cultivated, a necessary length may be ensured by forming the culture vessel as a coiled plastic or metal tube.

The culture vessel is packed with a culture medium suitable for the plant to be cultivated. The type of the culture medium is not specifically limited, and may be natural or artificial such as perlite, vermiculite or rockwool so far as it can moderately contain water and air so that the moisture content of the culture medium slowly varies when the water level in the water tank is changed and it is suitable for cultivating the plant to be evaluated. Such culture media that can be preferably used include sand, sandy loam, clay loam, andosol, or mixtures thereof, or commercially available composts for gardening. Fertilizers necessary for the growth of the plant are preferably added to the culture medium. The culture vessel is preferably packed with the culture medium as uniformly as possible to avoid large gaps. A net or unwoven cloth is preferably laid on the bottom hole to prevent leakage of the culture medium through the bottom hole of the culture vessel. The net or the like laid on the bottom hole can be selected from those having any shape and made from a material resistant to decomposition or corrosion and clogging.

The culture vessel is installed in a container capable of pooling water (hereinafter referred to as "water tank"). The method for installation is not specifically limited so far as the culture medium can be supplied with water through the bottom hole of the culture vessel from the water tank by preventing close contact between the inner bottom of the water tank and the bottom hole of the culture vessel, e.g., the culture vessel can be readily installed by placing it on a plastic or the like net having some thickness laid on the bottom of the water tank. In this case, water in the water tank can sufficiently penetrate to the bottom face of the culture vessel through the meshes of the net. The depth of the water tank may be smaller or greater than that of the culture vessel, but it is preferably in such a range that the surface of the culture medium in the culture vessel may not be dry when the water tank is full of water while the shadow of the lateral wall may not adversely affect the growth of the plant when the water tank is deeper than the culture vessel. When the culture vessel is installed in the water tank, the difference in height between the water tank and the culture vessel is preferably within 50 cm, or within 30 cm, or even within 10 cm. When the depth cannot be ensured to prevent drying of the surface of the culture medium, however, a necessary culture medium moisture may be kept by irrigation from above the vessel until drought stress treatment starts. The opening of the water tank is not limited, but is preferably large enough for ten or more culture vessels to be installed in terms of operating efficiency. Materials of the water tank are not limited, but preferably include plastics, metals, concrete, etc., because of high strength and availability.

Water is pooled in the water tank to moisten the culture medium. The air in the culture medium can be readily removed and the entire culture medium can be certainly and rapidly moistened because water can be fed through the bottom hole of the culture vessel from the water tank. The water level in the water tank is not specifically limited, but water is preferably pooled to a height that allows the surface of the culture medium to be moistened before plant cultivation. Even in the case of plants not favoring high culture medium moisture, sufficient water is preferably pooled in the water tank to moisten the entire culture medium once and then the water level is lowered to provide moderate culture medium moisture conditions before cultivation starts. Instead of raising the water level in the water tank to moisten the surface of the culture medium, the culture medium may be irrigated from above to moisten the culture medium, in which case, however, it must be carefully irrigated many times for several days to moisten the entire culture medium.

In the present invention, the water level may also be adjusted by for e.g., separately installing the water tank and the culture vessel and connecting the bottom hole of the culture vessel and the bottom or lower part of the water tank via a tube or other like object, instead of installing the culture vessel in the water tank. In this manner, the water level in the culture vessel can also be adjusted by vertically regulating the water level in the water tank or the position thereof.

Thus, the expression "installing the culture vessel in the water tank" as used herein means that the water tank and the culture vessel are installed in such a manner that the water level in the culture vessel can be adjusted by regulating the water level in the water tank, and include installing the culture vessel in the water tank as well as connecting the culture vessel to the bottom or lower part of the water tank.

The planting density is not specifically limited so far as the plant can normally grow, but e.g., 1 to 100 individuals, more preferably 5 to 30 individuals per 100 cm$^2$ of the planting area in the culture vessel in the case of rice. For large plants such as maize, the planting density is preferably lower, e.g., 1 to 200 individuals, more preferably 10 to 100 individuals per m$^2$ of the planting area in the culture vessel.

Planting of the plant to be evaluated may be performed by directly sowing seeds in the culture vessel or transplanting a seedling grown in a seedling box or the like. Alternatively, a seedling may be grown in a container having a hole or the like for passage of plant roots and the container including the seedling may be mounted on the culture vessel.

When seeds are directly sown in the culture vessel, the methods of the present invention are preferably performed on a plant which has been cultivated for some time after germination. When a seedling is planted in the culture vessel, the methods of the present invention are preferably performed after the seedling has been rooted.

In the methods of the present invention, the plant is preferably cultivated under moisture conditions suitable for the growth of the plant at an early stage of cultivation, and once roots have somewhat elongated the water level in the water tank is gradually lowered to impose drought stress on the plant.

The water level in the culture vessel can be readily lowered by lowering the water level in the water tank because water in the culture vessel and the water tank communicate via the bottom hole.

The time to start lowering the water level and the scheme of lowering it depend on the plant to be evaluated, but the start time is preferably after the period during which roots elongate by at least about 10 cm and before they reach half of the depth of the culture vessel. This period is preferably determined on the basis of a preliminary experiment or the like that roughly examines root growth characteristics of the plant to be evaluated. It may also be based on the root growth observed by using a transparent plastic culture vessel. The decrement in water level is not specifically limited and is preferably determined by observing the state of the plant with due attention to the temperature and light amounts, but specifically 10 cm to 100 cm per week is preferred. When a rice seedling at the 3 to 4-leaf stage is planted, for example, the time to start lowering the water level is preferably between 1 week and 5 weeks, more preferably between 1 week and 4 weeks after planting, and the decrement in water level is preferably 10 cm to 100 cm, more preferably 20 cm to 70 cm per week. Thus, to take rice as an example, one should preferably start lowering the water level between 1 week and 4 weeks after planting and then lower it by a total of 80 cm to 150 cm for 1 to 5 weeks. When the water level is lowered by 50 cm per week, for example, it may be lowered by 50 cm at once or in steps every several days.

The water level in the water tank can be lowered by pumping water, draining water from a drain port formed near the bottom of the water tank, draining water from drain ports formed at intervals of e.g., 10 cm on the lateral wall of the water tank, etc.

The culture medium gradually dries downward from the surface by water absorption by the plant and evaporation from the surface of the culture medium because the water level in the culture vessel drops with the water level in the water tank. Individuals capable of deeply elongating their roots faster than the rate of dehydration of the culture medium proceeds to retain the ends of the roots in a layer rich in water and are not subjected to drought stress. However, individuals slowly elongating their roots stop growth for lack of water available around the roots and show drought stress symptoms such as leaf curl, and as the culture medium further dries, leaves begin to die and finally death.

At an appropriate time, the state of leaves and stems is observed to select deep-rooted individuals. Individuals showing milder drought stress symptoms are selected as deep-rooted individuals because individuals having undergone drought stress earlier, i.e., individuals elongating their roots more slowly show more severe symptoms. Selection of plants can be facilitated by planting one to several plants of a control line in each vessel to evaluate the degrees of stress symptoms of the test plant in comparison with these control plants.

The methods of the present invention can be used as tools for breeding plants having drought resistance mediated by deep rooting property because multiple plant individuals can be conveniently and efficiently evaluated and screened for their deep rooting property. This involves evaluating and/or screening multiple lines of plants for deep-rooted plants according to the methods of the present invention. For example, the methods of the present invention can be used in the step of selecting deep-rooted individuals or lines as breeding mother plants from breeding materials or the step of selecting deep-rooted individuals or lines from a progeny obtained by crossing breeding materials or breeding mother plants during breeding. Thus selected individuals or lines can also be used as further breeding mother plants. Alternatively, transformants containing a gene supposed to be related to deep rooting property can be tested by using the methods of the present invention to evaluate them for the gene. Moreover, a number of transformants containing a given DNA fragment can be tested/evaluated by the methods of the present invention to search for a gene related to deep rooting property.

The present invention also provides an apparatus for evaluating plants for deep rooting property by the methods of the present invention, comprising an open-bottomed culture vessel having enough depth for plants to elongate their routs and a water tank in which the culture vessel is to be installed, wherein the culture vessel is packed with a culture medium and installed in the water tank to cultivate plants and the moisture content of the culture medium in the culture vessel can be controlled by adjusting the water level in the water tank. It will be understood by those skilled in the art that various modifications and changes as described above for the methods of the present invention may be added to the apparatus of the present invention, and that such modifications and changes are also within the scope of the present invention. A schematic diagram of the apparatus of the present invention is shown in FIG. 1. FIG. 1 is intended to show the concept of the present invention, but not to limit the present invention to the embodiment shown in the schematic diagram.

Deep-rooted plants selected and bred by the methods of the present invention are suitable for cultivation primarily in dry environments, and the present invention can be applied to select and breed not only grains, vegetables, ornamental plants and other commercial crops but also trees planted as forest resources or for desert greening. Such trees include *Fagus crenata, Camellia japonica, Cinnamomum camphora, Osmanthus, Prunus* spp., *Salix, Magnolia quinquepeta, Prunus mume, Quercus acutissima, Aucuba japonica, Rhododendron, Cryptomeria japonica, Chamaecyparis obtusa, Phoenix dactylifera, Tamarix, Mimosa, Phoenix dactylifera, Eucalyptus*, pines, poplar, elm, *Elaeagnus angustifolia*, etc. The present invention is preferably applied to these trees when they are still young with short roots.

Effects of the Invention

The methods of the present invention are suitable for large-scale screening because deep-rooted individuals can be selected without actually measuring root growth so that these methods include no labor-intensive step such as digging a trench in a field as in the trench method and save much labor as compared with the trench method. According to the methods of the present invention, deep rooting property can be compared under the same culture medium moisture conditions because multiple plants can be cultured in the same culture vessel, in contrast to previously known cylinder methods in which different varieties were cultivated in separate vessels so that root growth of multiple varieties cannot be compared under the same culture medium moisture conditions. Moreover, the methods of the present invention greatly facilitate management of cultivation conditions such as water level adjustment as compared with conventional methods.

Thus, the methods of the present invention are practical methods capable of large-scale screening for deep-rooted plants, which not only allow multiple plants to be cultivated and compared under the same moisture conditions but also greatly facilitate management of cultivation conditions such as water level adjustment. According to the methods of the present invention, plants can be conveniently, efficiently and reliably evaluated for deep rooting property.

BRIEF EXPLANATION OF THE DRAWINGS

FIG. 2-1 is a graph showing transition of the averages of scores of drought stress symptoms in various varieties in each culture vessel in each tank (tank 1, 2) according to a method of the present invention. The results are shown in a. tank 1—culture vessel A, b. tank 1—culture vessel B, c. tank 1—culture vessel C, d. tank 2—culture vessel A, e. tank 2—culture vessel B, f. tank 2—culture vessel C.

FIG. 2-2 is a graph showing transition of the averages of scores of drought stress symptoms in various varieties in each culture vessel in each tank (tank 3, 4) according to a method of the present invention. The results are shown in g. tank 3—culture vessel A, h. tank 3—culture vessel B, i. tank 3—culture vessel C, j. tank 4—culture vessel A, k. tank 4—culture vessel B, l. tank 4—culture vessel C.

LEGEND TO NUMERAL REFERENCES

Figure 1:
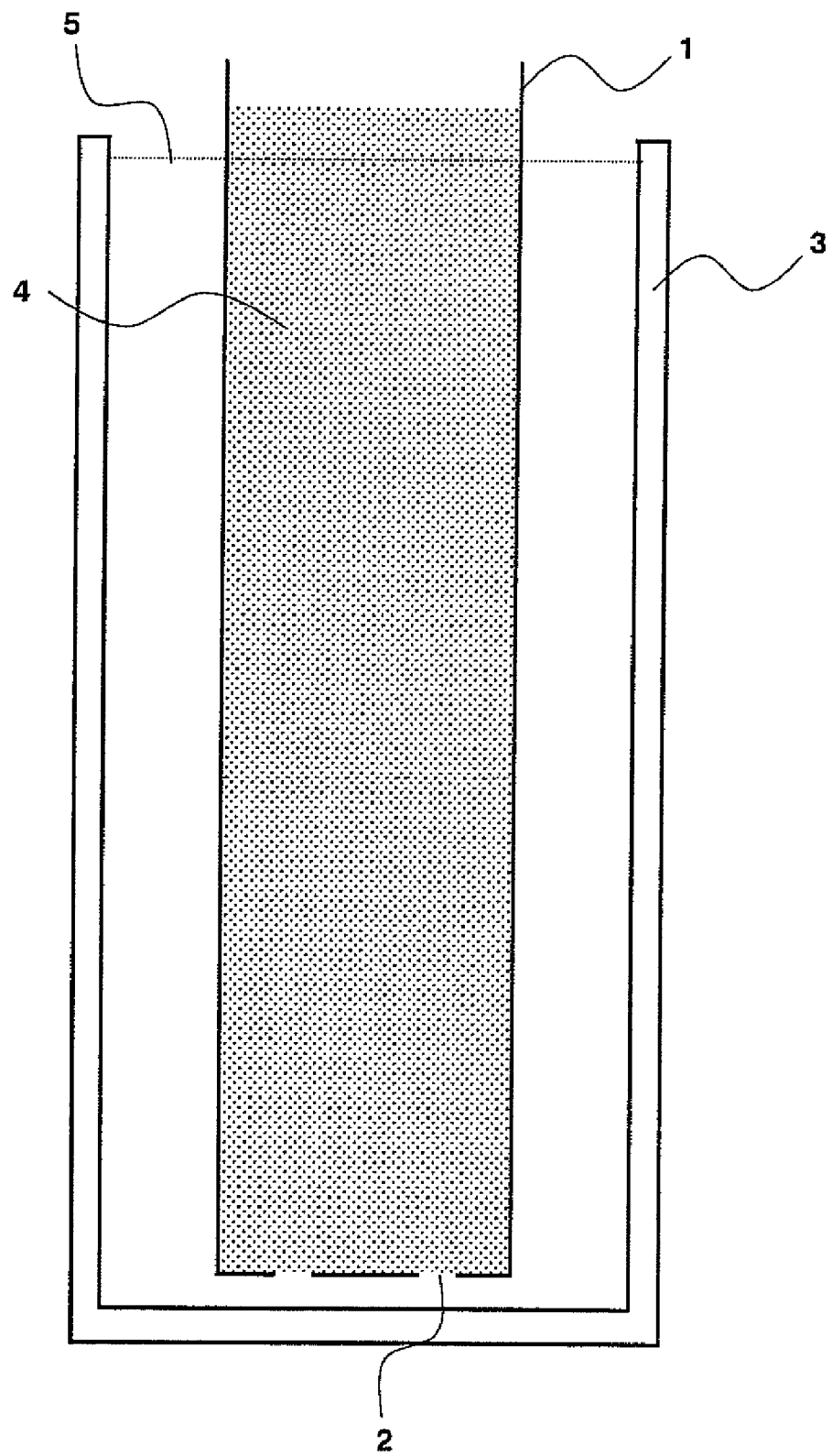
FIG. 1 is a schematic diagram in longitudinal section of an apparatus of the present invention.

1: culture vessel
2: bottom hole
3: water tank
4: culture medium
5: water (water level)

The following examples further specifically illustrate the present invention without, however, limiting the technical scope of the present invention thereto.

EXAMPLES

Example

Four varieties of rice (*Oryza sativa* L.) were used as test materials, i.e., a Japonica paddy rice variety "Yukihikari", a Japonica upland rice variety "Yumenchatamochi", an improved Indica variety "IR36" and a Japonica-Indica hybrid variety "Suweon 287". Yumenohatamochi has been reported to be deep-rooted and to show high drought resistance in a field (Hirasawa, Nemoto et al., Japanese Journal of Breeding 48: 415-419, 1998), and IR36 and Suweon 287 have been reported to show high drought resistance in pot tests (an article of Wada, Suzuki et al. in Japanese Journal of Crop Science 70: 580-587, 2001).

Seeds were sterilized in a 200-fold dilution of Healthied Starner Flowable for 4 days and treated for stimulating germination, and sown at a density of one seed per well in a nursery box for paddy rice seedlings (61×31×height 2.5 cm, cell diameter about 15 mm, 32 cell columns×14 wells) and raised there.

Three types of vessels made of polyvinyl chloride pipes (hereinafter referred to as "PVC pipes") were used for cultivation. Three types of PVC pipes of 1 m in length according to JIS K6741 VU50 (outer diameter 60 mm, inner diameter 56 mm), VU75 (outer diameter 89 mm, inner diameter 83 mm) and VU100 (outer diameter 114 mm, inner diameter 107 mm) were used for the vessel body. VU50 has a diameter so small that only a limited number of plants can be planted, and therefore, it was fitted with a reducing socket (nominal diameter 75×50) at the upper end so that the same number of plants as those of VU75 and VU100 could be planted. Each PVC pipe was fitted with a socket having a compatible diameter (nominal diameter 50×50, 75×50 or 100×50) at the lower end and further fitted with a cap (nominal diameter 50) having a hole of 9.5 mm in diameter (hereinafter referred to in the present example as "bottom hole") via VU50 having a moderate length so that all of the three culture vessels had an equal total length of about 117 cm. The vessels using VU50, VU75 and VU100 for their bodies were designated as culture vessel A, culture vessel B and culture vessel C, respectively.

Each vessel was packed with a soil mixture containing 32 g of a commercially available mixed fertilizer "MagAmp K (NPK=6, 40, 6%)" per 24 liters of a commercially available soil for raising paddy rice seedlings (hereinafter referred to in the present example as "culture medium"). The amounts of the culture medium packed in vessel A, B and C were about 3, 6.5, and 10 liters, respectively.

Four cylindrical water tanks of 88 cm in height, 56 cm in outer diameter, and 200 liters in volume (hereinafter referred to in the present example as "tank") were prepared, and a plastic net was laid at the bottom of each tank, and 4 culture vessels A, 4 culture vessels B and 3 culture vessels C were installed in each tank and then water was introduced into the tank. Water in the tank entered into the culture vessels through the bottom holes of the vessels and gradually moistened the culture medium. Even when the tank was full of water, an upper part of about 29 cm of each culture vessel remained above the water level, but water was sucked up to the surface of the culture medium within a day in most culture vessels. However, some vessels in which water was not sucked up to the surface of the culture medium were irrigated from above to moisten the culture medium.

On 13 days after sowing, a total of 8 individuals consisting of 2 individuals of each variety of rice seedlings at the 3-leaf stage to 4-leaf stage were planted in each culture vessel in such a manner that the individuals of the same variety were diagonally located. If the surface of the culture medium became dry after planting, the medium was irrigated as appropriate to protect against drought stress.

From 2 weeks or 3 weeks after planting, a drought stress treatment was performed by lowering the water level in the tank in two to four steps. Table 1 shows a scheme of lowering the water level in each tank. As shown, the water level in tank 1 was lowered by 20 cm at week 2 weeks after planting, then 20 cm and 30 cm at intervals of a week, and finally to the bottom of the tank at 5 weeks after planting. Similarly, the water level in tank 2 was lowered from 3 weeks after planting by 40 cm, 30 cm and 18 cm, while the water level in tank 3 was lowered from 3 weeks after planting by 20 cm, 30 cm, 30 cm and 8 cm. Even when water was pumped out from tanks 1, 2 and 3 to the bottom of the tank, water gradually leaked from the culture vessels, but this water was left as it was in the tank. This water was lost by evaporation or transfer to the culture vessels within a week. The water level in tank 4 was lowered by 50 cm at 4 weeks and 30 cm at week 5 weeks after planting, and water was left at the height of 8 cm above the bottom. Water remained on the bottom of tank 4 even at 9 weeks after planting. It should be noted that the water level could be readily lowered by pumping out water from the tank.

[Table 1]

TABLE 1

Transition of water levels
Water level above the tank bottom in cm

| | At Planting | 2nd Week | 3rd Week | 4th Week | 5th Week | 6th Week |
|---|---|---|---|---|---|---|
| Tank 1 | 88 | 68 | 48 | 18 | 0 | (0) |
| Tank 2 | 88 | (84) | 48 | 18 | 0 | (0) |
| Tank 3 | 88 | (84) | 68 | 38 | 8 | 0 |
| Tank 4 | 88 | (84) | (81) | 38 | 8 | (8) |

The values in parentheses represent water levels lowered by natural water loss.

The distance from the top of each vessel to the surface of water is 117 minus the value in the table (cm).

From several days after the water level in the tank was lowered, the surface of the culture medium began to dry, and from around 5 weeks after planting (3 weeks after the start of drought stress treatment), plants began to show drought stress symptoms such as leaf curl.

Individual plants having undergone drought stress stopped growing and began to show drought stress symptoms of inward leaf curl. As the culture medium further dried, leaves curled more tightly in a cylindrical, and then needle form. Leaves remained in the needle form for some time and then began to die from their tips and finally dried out from leaf sheaths and died. However, Yumenohatamochi sometimes dried out while some leaves slightly curled.

Between 5 and 9 weeks after planting, each individual was scored according to drought stress symptoms three times (or twice) a week (Table 2).

[Table 2]

TABLE 2

Scores and severities of stress symptoms

| Score | Degree of stress symptoms |
|---|---|
| 6 | No visible stress symptoms (neither leaf curl nor wilting is observed). |
| 5 | Leaves curl in a cylindrical form. Or leaves slightly wilt and their tips hang down. |
| 4 | Leaves tightly curl in a cylindrical form to needle form. Or leaves totally wilt and hang down. |
| 3 | Leaf blades partially begin to dry - water remains somewhere in the leaf blades. |
| 2 | Leaf blades dry out, but leaf sheaths are alive. |
| 1 | The entire outsides of leaf sheaths dry and look whitish. |
| 0 | Leaf sheaths almost dry and feel soft to the touch. Presumably died. |

Figures 1, 2:
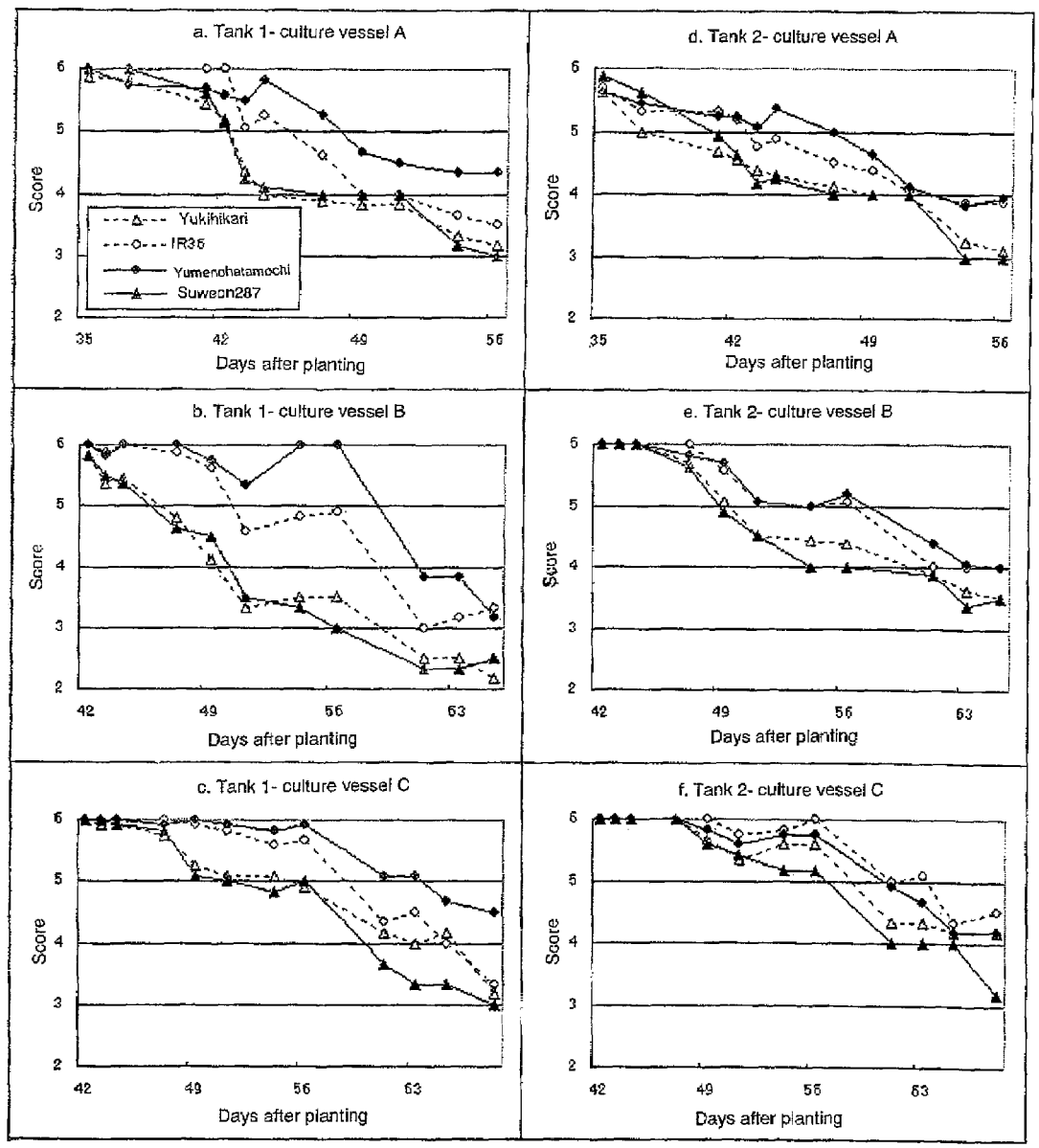
Figure 2:
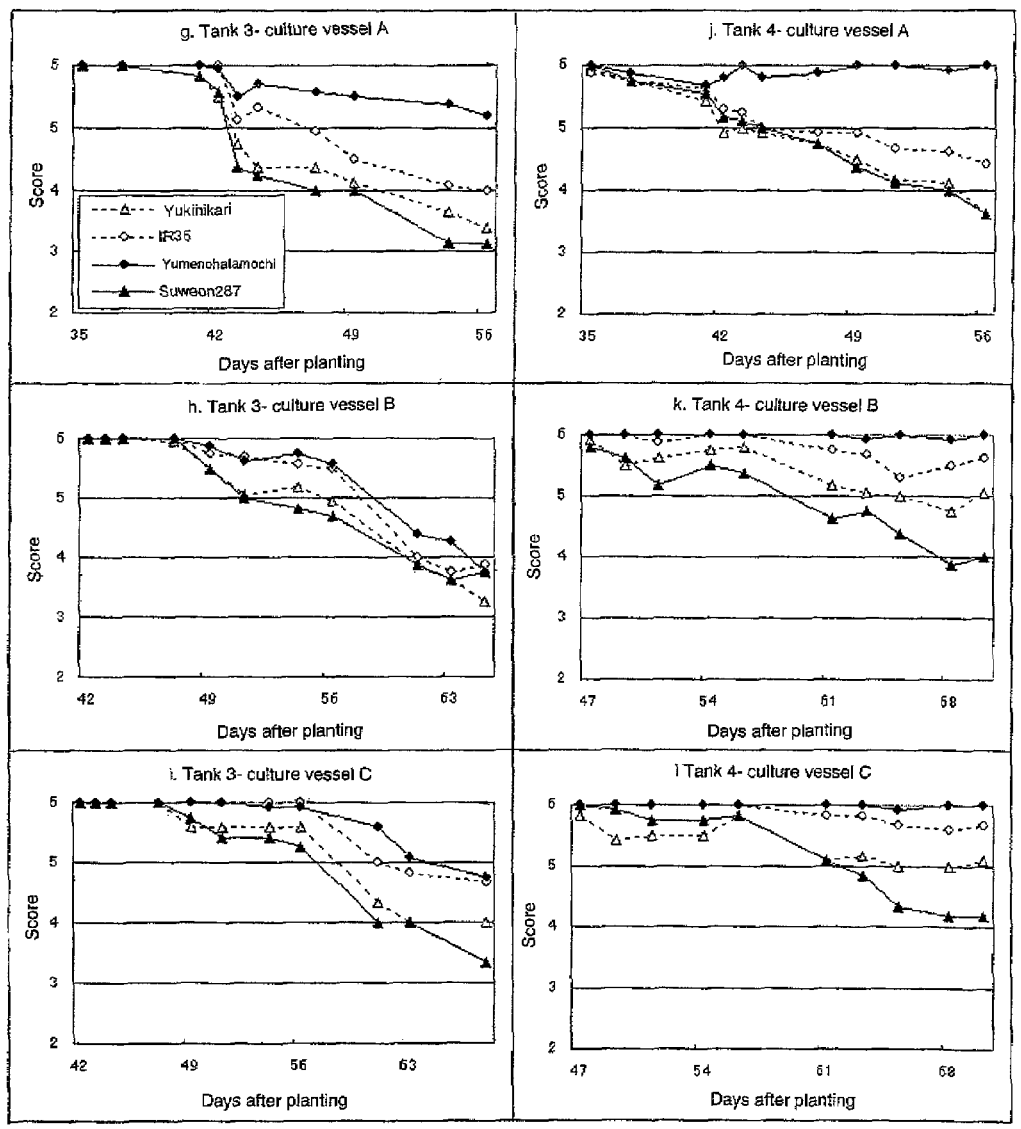

FIG. 2-1 *a* to *f* and FIG. 2-2 *g* to *l* show transition of the averages of scores in various varieties in each culture vessel in each tank.

Drought stress symptoms began to appear earlier in culture vessels having smaller diameters, though no clear difference was found between culture vessels B and C. Meanwhile, the time when drought stress symptoms began to appear did not widely differ between tanks. In tank 1, for example, it was 35 days after planting in culture vessel A, 47 days in culture vessel B, and 49 days in culture vessel C. In tank 4, which started lowering the water level last, it was 37 days in culture vessel A, and 47 days in both culture vessels B and C.

Although the time when drought stress symptoms began to appear and the progress thereof slightly varied depending on the diameter of the culture vessel and the scheme of lowering the water level, Yukihikari and Suweon 287 showed rapid progress of symptoms, followed by IR36, and finally Yumenohatamochi in any culture vessel. This relation between the varieties was nearly unchanged during observation after stress symptoms began to appear, indicating that discrimination is possible at any time. Scores widely differed between varieties of plants in a period of 1 to 2 weeks after symptoms began to appear, but discrimination is also possible even earlier because actual observation reveals clear differences in appearance.

At 8 weeks after planting, culture vessel A was removed from tanks 1, 2 and 3 and tapped on the lateral wall with the planting face downward, and the culture medium was drawn out with care to avoid breaking roots and the dryness of the culture medium and roots were observed. The longest root in each culture vessel had a length of 73 to 80 cm in tank 1, 62 to 64 cm in tank 2, and 70 to 83 cm in tank 3, and the culture medium was wet to about 10 to 15 cm above the end of the longest root, but dry above it. The longest root was traced to show that it belongs to Yumenohatamochi.

Thus, the roots of Yumenohatamochi showing the mildest stress symptoms elongated most deeply. This demonstrated that deep-rooted plants can be efficiently and readily selected by the method of the present invention.

Comparative Example

For comparison with the present invention, the seedlings tested in the example were evaluated for drought resistance by testing them using shallow vessels according to the method of Wada et al. (Wada, Suzuki et al., Japanese Journal of Crop Science 70:580-587, 2001, which is incorporated herein by reference in its entirety). The seedlings were planted in plastic pots (diameter 12 cm, height 10 cm) packed with the culture medium having the same composition as that of the example and cultivated on a bed containing water to a depth of about 3 to 4 cm while water was fed from the bottom. The seedlings were identical to those tested in the example and planted by the same method as used in the example. On 37 and 44 days after planting, watering to 2 pots was stopped and a drought stress treatment was performed. The state of the plants was observed three to four times daily, and when leaf sheaths of Yukihikari dried to their bases, the pots were rewatered. The state of leaves and stems was observed during drought stress treatment and 3 days after rewatering, and scored as shown in Table 2 during drought stress treatment and Table 3 after rewatering.

[Table 3]

TABLE 3

Scores and the state of leaves and stems after rewatering

| Score | State of leaves and stems |
|---|---|
| 0 | Both blade and sheath remain dry. |
| 1 | A part to about half of the sheath is green and alive. |
| 2 | Half to most of the sheath is alive, but no leaf recovers the blade. |
| 3 | One leaf shows that the blade is partially green and alive. |
| 4 | 2-4 leaves show that the blade is partially green and alive. |
| 5 | 5 or more leaves show that the blade is alive. |

Figure 3:
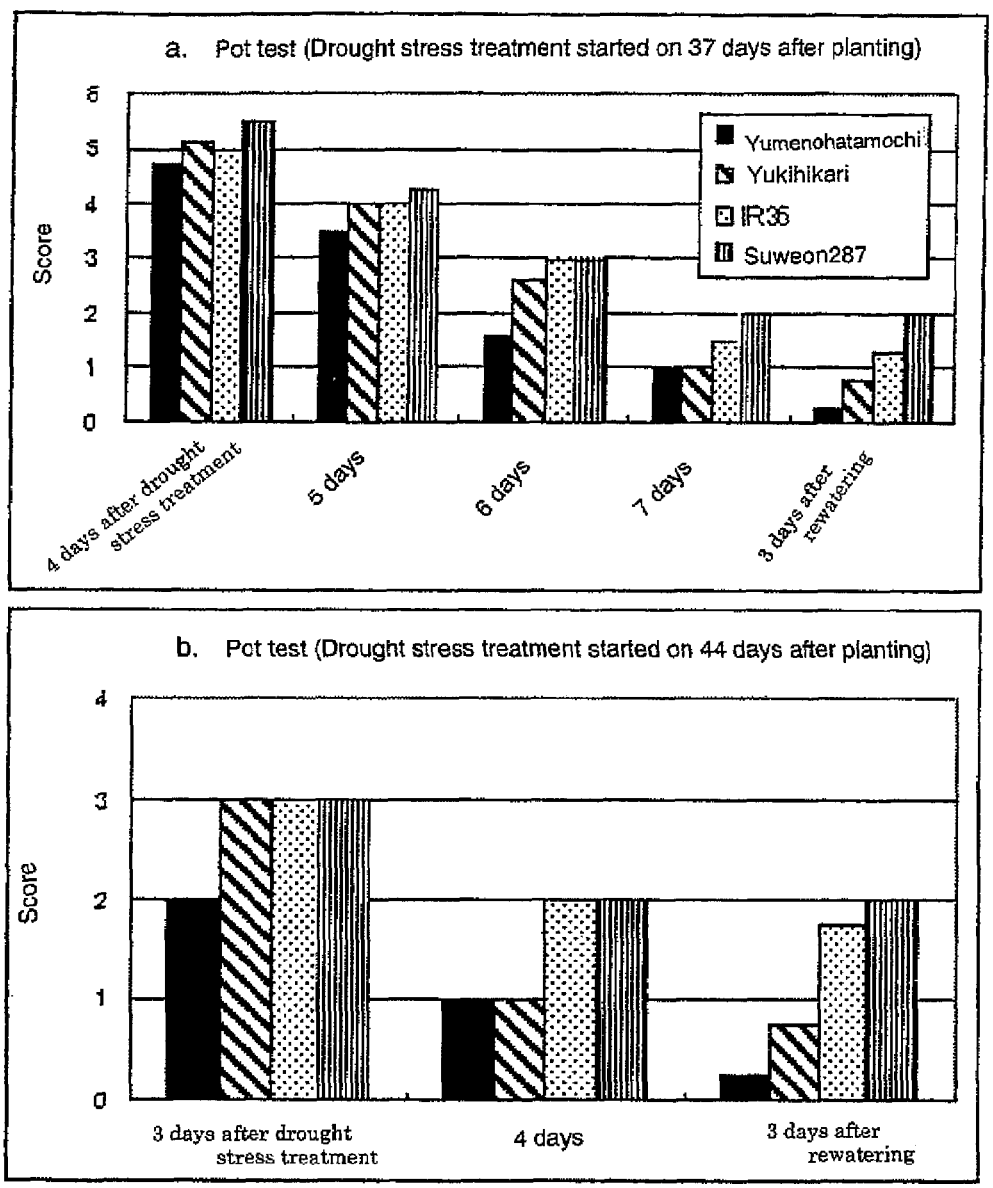
FIG. 3 shows the results of a drought resistance test according to the method of Wada et al. (Japanese Journal of Crop Science, 70: 580-587, 2001). The results are shown in a. drought stress treatment started on 37 days after planting, b. drought stress treatment started on 44 days after planting.

FIGS. 3a and 3b show the results of the pots in which drought stress treatment started on 37 and 44 days after planting, respectively. According to this method, Suweon 287 was the most resistant to drought, followed by IR36, Yukihikari, and finally Yumenohatamochi. These results were quite different from the evaluation results by a method of the present invention that Yumenohatamochi was the most resistant to drought while Suweon 287 was the most sensitive to drought.

Yumenohatamochi is an upland rice variety showing high drought resistance mediated by deep rooting property (Hirasawar Memoto et al., (1998) Japanese Journal of Breeding 48:415-419). Nemoto et al. (Nemoto, H., Suga, R. et al., (1998) Breeding Science 48:321-324) observed the amounts and depths of roots at varying soil depths by the trench method by cultivating a number of rice varieties in a field and evaluated drought resistance by cultivating them in a vessel of 10 cm in depth. As a result, they reported that deep rooting property was not clearly related to wilting degree due to the absence of irrigation but positively related to recovery.

However, comparison between the results of the example and comparative example show that resilient varieties in the test using a shallow vessel were not always deep-rooted. Thus, the report of Nemoto et al. and the results of the example and comparative test show that deep-rooted plants may not be selected in a test using a shallow culture vessel.

These results showed that the methods of the present invention are excellent for conveniently and reliably selecting deep-rooted plants.

INDUSTRIAL APPLICABILITY

The methods of the present invention are convenient and efficient methods capable of large-scale screening for deep-rooted plants, which not only allow multiple plants to be cultivated and compared under the same moisture conditions but also significantly facilitate management of cultivation conditions such as water level adjustment. By these characteristics, the use of the methods of the present invention allows deep-rooted plants to be efficiently selected and therefore contributes to the improvement of the breeding efficiency of drought-avoidant plants.

The invention claimed is:

1. A method for evaluating multiple plant individuals for deep rooting property under the same culture medium moisture conditions, comprising the steps of:
   (1) installing in a water tank an open-bottomed culture vessel having a depth enough for plants to elongate their roots and packed with a culture medium;
   (2) planting multiple plant individuals in the culture vessel;
   (3) gradually decreasing the moisture content of the culture medium by lowering the water level in the water tank to impose drought stress on the plants; and
   (4) evaluating the plants for deep rooting property from drought stress symptoms observed in the plants.

2. The method of claim 1 wherein the culture vessel has a depth of 30 cm or more and 300 cm or less.

3. The method of claim 1 wherein the difference in depth between the water tank and the culture vessel is within 50 cm.

4. The method of claim 1, wherein the culture medium is selected from the group consisting of sand, sand loam, clay loam, andosol, and mixtures thereof, as well as commercially available composts for gardening.

5. The method of claim 1, wherein the planting density of the plants in the culture vessel is 1 to 100 individuals per 100 $cm^2$.

6. The method of claim 1, wherein the planting density of the plants in the culture vessel is 1 to 200 individuals per $m^2$.

7. The method of claim 1, wherein the plant is an angiosperm.

8. The method of claim 1, wherein the multiple plant individuals belong to different lines.

9. A method for selecting deep-rooted plants from multiple plant individuals under the same culture medium moisture conditions, comprising the steps of
   (1) installing in a water tank an open-bottomed culture vessel having a depth enough for plants to elongate their roots and packed with a culture medium;
   (2) planting multiple plant individuals in the culture vessel;
   (3) gradually decreasing the moisture content of the culture medium by lowering the water level in the water tank to impose drought stress on the plants; and
   (4) selecting plant individuals showing milder drought stress symptoms observed in the plants as deep-rooted plants.

* * * * *